Dec. 18, 1928. 1,695,818

E. G. OAKLEY

DUST CAP FOR TIRE VALVES

Filed July 9, 1924

Inventor

Erastus G. Oakley

By Henry E. Rockwell

Attorney

Patented Dec. 18, 1928.

1,695,818

UNITED STATES PATENT OFFICE.

ERASTUS G. OAKLEY, OF SOUTHPORT, CONNECTICUT, ASSIGNOR TO BRIDGEPORT BRASS COMPANY, OF BRIDGEPORT, CONNECTICUT.

DUST CAP FOR TIRE VALVES.

Application filed July 9, 1924. Serial No. 725,076.

This invention relates to dust caps for so-called tire valves or the like, and more particularly to a cap designed to fit over the valve stem or shell in general use in connection with pneumatic tires.

According to the present invention, I provide a dust cap which may be termed a "slip on" cap, in that it may be secured in place by a longitudinal thrust and without the necessity of a rotative movement relatively to the stem. It may be removed in the same manner and therefore may be placed upon and removed from the stem with facility and celerity when desired. At the same time, means are provided for securely holding the cap in place so that there will be no danger of its accidental removal from the stem, and the ingress of dust and foreign matter about the same will be obviated.

One object of my invention is to provide a dust cap for tire valve stems which may easily be removed from and replaced upon the stem and which, at the same time, will be economical to manufacture and will be securely held in place when in use.

Another object of my invention is the provision of a "slip on" dust cap which may be readily applied to the tire valve stem and which will be frictionally and tightly held thereon so that it will not be lost and no rattling or other objectionable noise will be present.

To these and other ends the invention consists in the novel features and combination of parts to be hereinafter described and claimed.

Figure 1:
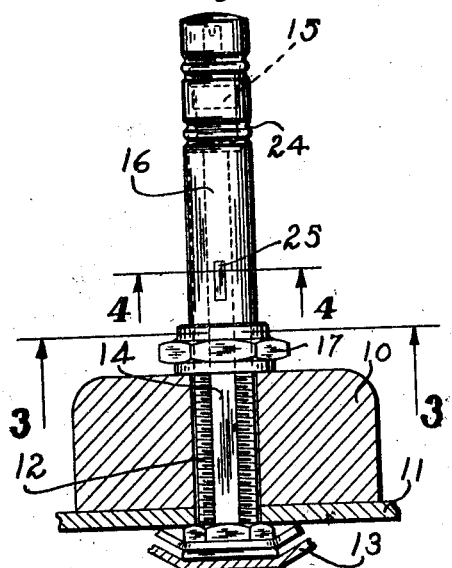
Fig. 1 is a side elevational view of a tire valve stem, having thereon a dust cap embodying my improvements.

Referring to Fig. 1 of the drawings, I have shown a wheel felly at 10 to which is secured the rim 11, the rim and felly being perforated for the passage of the usual threaded valve stem 12 secured to the inner tube 13 in the usual manner. The valve stem is generally threaded throughout its length and over its entire body except that it is usually provided with opposite flat sides 14 which do not bear any threads. Upon the upper portion of the valve stem, which may be reduced in size, is ordinarily placed a valve cap 15 shown in dotted lines in Fig. 1. The dust cap designated as a whole by the numeral 16 is then placed over the projecting end of the valve stem and also over the valve cap, which is of sufficiently small size to be freely received within the dust cap.

According to the present invention, a rim nut 17, provided with a threaded bore 18, is threaded upon the valve stem and arranged to seat against the wheel felly. This rim nut may be provided with a bottom cavity 19 to receive a washer, or the like (not shown) which is customarily disposed between the lower face of the rim nut and the felly.

Figure 2:
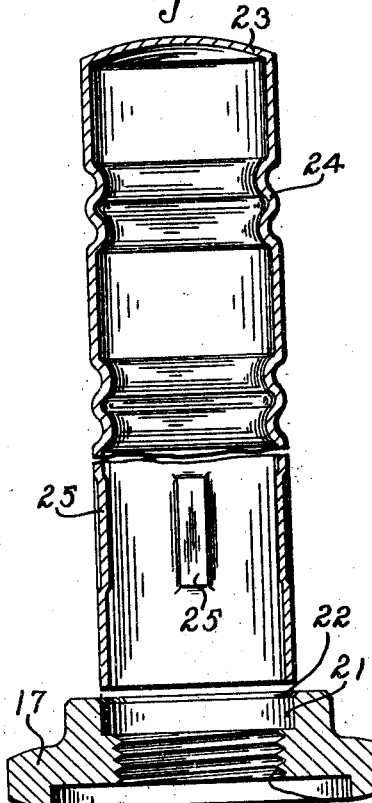
Fig. 2 is an enlarged sectional view of the dust cap and rim nut.

The rim nut is provided in its upper face with a cavity or seat 21 in the form of an annular depression surrounding the valve stem. As clearly shown in Figs. 2 and 3, the diameter of this cavity is somewhat larger than that of the threaded bore 18, so that when placed upon the stem a clearance space will remain between the periphery of this cavity and the exterior surface of the valve stem. Adjacent its upper edge, the wall of the cavity 21 is slightly beveled, as shown at 22, so that the mouth of the cavity flares outwardly to some extent for a purpose to be hereinafter described.

The dust cap 16 is made of relatively light material and may be, if desired, a sheet metal product made by stamping or drawing processes. The upper end is closed as shown at 23, the lower end, however, being left open to receive the valve stem. The dust cap is circular in cross-section and only slightly larger than the valve stem, so that while it, throughout the greater portion of its length, will clear the surface of the stem when placed thereupon, the amount of this clearance is slight. The body of the cap may be provided with a number of corrugations 24, so that it may be firmly gripped between the fingers when it is desired to remove it from or place it upon the stem.

Figure 5:
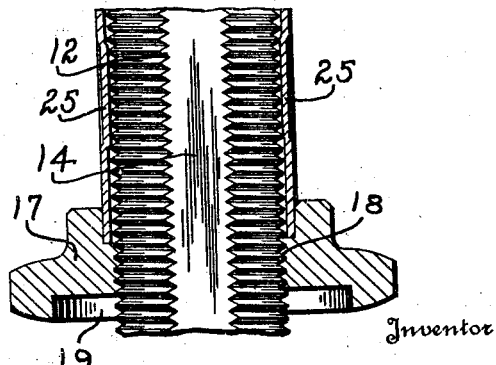
Fig. 5 is an enlarged sectional view similar to Fig. 2, but showing the valve stem within the dust cap, and the latter seated in the recess in the rim nut.

Adjacent its lower end the metal of the wall of the dust cap is displaced inwardly at spaced points around the circumference of the cap to provide a number of depressed portions or ribs 25. Four of these depressed portions or ribs are shown in the drawing, but it will be understood that the number may be varied if desired. At these points the metal of the cap is preferably not broken but only displaced sufficiently to make an exterior depression in the cap wall of substantially rectangular shape, and preferably the length of the depressed portion will considerably exceed the width, the length of the ribs 25 being at least twice as great as the width. The ribs will ordinarily possess no resilience relatively to the body of the cap itself, so that any pressure upon these ribs will tend to distort the whole cap rather than to distort the ribs, as will be explained hereinafter. The inner surface of these ribs is offset from the inner wall of the cap to a sufficient extent to contact with the exterior threaded surface of the stem and secure the cap in place. It will be understood, of course, that the cap may be freely slipped on and off the valve stem and that no rotary or turning movement is required to secure it in place. The outer diameter of the cap 16 is preferably substantially equal to the inner diameter of the cavity 21 so that the cap will seat snugly therein, as shown in Fig. 5.

Figure 4:
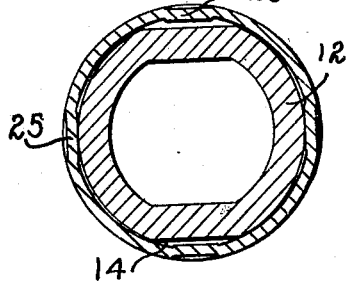
Fig. 4 is a sectional view on line 4—4 of Fig. 1.

When the cap is applied to the valve stem at least some of the depressed ribs 25 will lie opposite the threaded or convex portions of the stem, and as these ribs contact with the stem they will cause the cap to grip the latter and to be held thereon. The outward pressure exerted by the stem upon these rib portions will cause the cap to be distorted into a somewhat elliptical or oblong shape in cross-section, the sides of the cap opposite the flat sides of the stem being permitted to be drawn together slightly as at these points the ribbed portions are not in contact with the sides of the stem as shown in Fig. 4. The tendency of the cap, the metal of which is somewhat resilient, to restore itself to its normal shape, will bring about a tight gripping action between the cap and stem.

When, however, the cap is moved downwardly upon the stem to a sufficient extent, the lower end enters the cavity 21, which is circular in shape and substantially of the same diameter as the exterior diameter of the cap. The flaring mouth 22 of the cavity 21 properly receives the lower end of the cap and guides it into place, notwithstanding the fact that this end of the cap will be somewhat elliptical in shape, as otherwise the distorted end of the cap might offer resistance to such movement. It will now be apparent that two opposing forces are acting upon the wall of the cap at adjacent points, in that the wall of the cavity 21 tends to force the wall of the cap into a truly circular shape while at a point above the upper edge of the nut 17, and especially opposite the ribs 25 the pressure of the stem upon these ribs tends to deform the cap into the oblong or elliptical shape referred to above. The result is that the normal tendency of the cap to restore itself to its circular shape and the consequent pressure of the ribs upon the valve stem will be augmented by the pressure of the wall of the cavity 21 upon the cap, and a still tighter gripping action will be produced. In other words, two opposing forces will be reacting upon the cap, one of which tends to distort it into an oblong shape and the other tending to force it into its normal circular shape, the result being that there will be a gripping action not only between the valve stem and dust cap, but also between the dust cap and rim nut, so that the former will be securely held in place.

Figure 3:
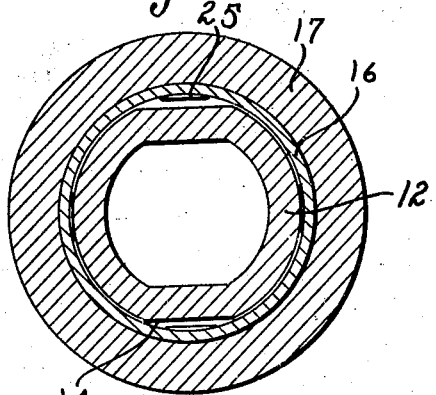
Fig. 3 is a transverse section through the dust cap and rim nut on line 3—3 of Fig. 1.

At the same time, the cap may be applied to and removed from the stem by a longitudinal thrust without the necessity of any rotary movement. It is, of course, not necessary to locate the ribs 24 so that some of these may lie opposite the flat sides of the valve stem, as shown at Figs. 3 and 4, for all of the ribs may lie opposite and engage the convex part of the stem, if it so happens that the cap is applied in this position, and the operation of the parts will not be affected as the depressed ribs will function equally well in frictionally holding the cap in place.

While I have shown and described a preferred embodiment of my invention, it will be understood that it is not to be limited to the details shown but is capable of modification and variation within the spirit of the invention and within the scope of the appended claims.

What I claim is:

1. In combination, a valve stem, a resilient metal dust cap adapted to be placed thereon, the wall of said dust cap being depressed inwardly to provide non-resilient ribs projecting beyond the inner wall of the cap, said ribs being adapted to engage the valve stem and to distort the cap from its normal shape and thereby cause it to grip the stem, and a rim nut provided with an upwardly facing recess to receive the lower edge of the valve cap and urge it to its normal shape.

2. In combination, a valve stem, a resilient metal dust cap adapted to be placed thereon, said dust cap being normally of circular shape and adapted to be slipped freely upon the valve stem, the wall of said cap being displaced inwardly at spaced points adjacent its lower end to provide non-resilient ribs, said ribs being adapted to engage the stem and distort the cap from its normal circular shape, when it is placed upon the stem, and a rim nut provided with an upwardly facing recess to receive the lower edge of the valve cap and urge it to its normal shape.

3. In combination, a valve stem, a resilient metal dust cap of circular cross-sectional shape adapted to be placed thereon, the wall of said dust cap being depressed inwardly but not cut through to provide non-resilient ribs projecting beyond the inner wall of the cap at spaced points, said ribs being adapted to engage the valve stem and to distort the cap from its normal circular shape and thereby cause it to grip the stem, and means to receive the lower edge of the dust cap when placed upon the stem and urge it to its normal circular shape.

4. In combination, a valve stem, a resilient metal dust cap of circular cross-sectional shape adapted to be placed thereon, the wall of said dust cap being depressed inwardly but not cut through to provide non-resilient ribs projecting beyond the inner wall of the cap at spaced points, said ribs being adapted to engage the valve stem and to distort the cap from its normal circular shape and thereby cause it to grip the stem, and means mounted upon said stem and provided with an upwardly facing flaring cavity within which the lower edge of the dust cap is received and urged to its normal circular shape.

5. A dust cap comprising a hollow elongated body closed at one end and open at the other and provided with a relatively thin resilient wall, the wall of the cap adjacent the open end thereof being displaced inwardly, but not cut through, at spaced points to provide narrow elongated ribs integrally connected upon all sides with the cap, the ribs being adapted to engage an object over which the cap is placed and distort the open end of the cap from its normal shape to secure the latter in position.

In witness whereof, I have hereunto set my hand this 7 day of July, 1924.

ERASTUS G. OAKLEY.